United States Patent [19]
Breme et al.

[11] Patent Number: 5,431,744
[45] Date of Patent: Jul. 11, 1995

[54] METHOD OF PRODUCING AN ACTIVE BRAZING PASTE

[75] Inventors: Jürgen Breme, Heusweiler; Heinz Müller, Marchweiler; Frank Hegner, Lörrach; Elke M. Schmidt, Schopfheim, all of Germany

[73] Assignee: Endress+Hauser GmbH+Co., Germany

[21] Appl. No.: 242,378

[22] Filed: May 13, 1994

[30] Foreign Application Priority Data

May 13, 1993 [EP] European Pat. Off. ............ 93810354

[51] Int. Cl.⁶ .............................................. B23K 35/34
[52] U.S. Cl. ........................................ 148/22; 148/23; 148/25
[58] Field of Search .................................... 148/22–25

[56] References Cited

U.S. PATENT DOCUMENTS

| | | | |
|---|---|---|---|
| 3,236,631 | 2/1966 | Knauff | 75/84 |
| 4,541,876 | 9/1985 | Hwang | 148/23 |
| 5,064,482 | 11/1991 | Goobich | 148/25 |
| 5,152,449 | 10/1992 | Mizuhara | 228/124 |
| 5,173,126 | 12/1992 | Ogura | 148/25 |

FOREIGN PATENT DOCUMENTS

| | | |
|---|---|---|
| 0456481 | 11/1991 | European Pat. Off. . |
| 1410887 | 2/1965 | France . |
| 664507 | 1/1952 | United Kingdom . |

*Primary Examiner*—Peter D. Rosenberg
*Attorney, Agent, or Firm*—Barnes & Thornburg

[57] ABSTRACT

To produce an active brazing paste suitable for brazing leads in insulating parts, e.g., ceramic parts, and containing an active brazing powder and an organic material acting as a vehicle, coarse pieces of the active brazing alloy are prehydrogenated. These pieces are ground in a mill with the addition of hydrogen to form a hydrogenated active brazing powder. The latter is then processed with the liquid vehicle openly, under normal atmospheric and temperature conditions, to form the active brazing paste.

3 Claims, No Drawings

METHOD OF PRODUCING AN ACTIVE BRAZING PASTE

FIELD OF THE INVENTION

The present invention relates to the production of an active brazing paste from a selected pulverized active brazing alloy by mixing the latter with an organic material acting as a vehicle.

BACKGROUND OF THE INVENTION

For the production of alloy powders by grinding pieces of a suitable, previously prepared alloy which contains an active metal, e.g., titanium, a process is described in "Titanium Science and Technology— Proceedings of the Fifth International Conference on Titanium", Vol 1, Munich, Sept. 1984, pp. 443 to 450, which is called "Hydride Dehydriding Process" (HDH) and in which coarse pieces of a selected active brazing alloy, particularly Ti6Al4V, are prehydrogenated and then pulverized. Thereafter the powder is carefully dehydrogenated.

The dehydrogenation before the grinding operation increases the brittleness of the coarse pieces and therefore improves their grindability. Hydrogen is adsorbed at the grain boundaries of the polycrystalline pieces until the latter are saturated with hydrogen.

Pulverizing mills, so-called colloid mills, are commercially available in which an inert gas, particularly hydrogen, is supplied to the material being ground.

If an active brazing powder obtained and dehydrogenated by the above HDH process is used to produce an active brazing paste, it must be miscible with an organic material acting as a vehicle and processible openly, i.e., under normal atmospheric and temperature conditions. Dehydrogenated active brazing powder, however, is susceptible to the adsorption of components of air, i.e., particularly of oxygen, water vapor, nitrogen and/or carbon dioxide, but also to the adsorption of C—H compounds stemming from the organic vehicle.

In a variant of the production of electrically conductive interface connections through insulating parts, particularly ceramic pressure sensors, a metal lead is inserted into a hole of the insulating part and surrounded by a bulge of active brazing paste which is subsequently vacuum-brazed with the insulating part and the lead at a high temperature, see EP-A-516 579 (=U.S. Ser. No. 07/981,781, Canadian Appln. No. 2,066,325).

It has turned out, however, that because of the absorptions mentioned above, an active brazing paste made from dehydrogenated active brazing powder is not suited for brazing such leads in place.

It is, therefore, the object of the invention to provide a method of producing an active brazing paste which does not have this disadvantage.

SUMMARY OF THE INVENTION

To attain this object, the invention consists in a method of producing an active brazing paste containing an active brazing powder and an organic material acting as a vehicle, said method comprising the steps of
  prehydrogenating coarse pieces of a selected active brazing alloy,
  grinding said prehydrogenated pieces in a mill with the addition of hydrogen to obtain a hydrogenated active brazing powder, and
  processing the hydrogenated active brazing powder with the liquid vehicle openly, under normal atmospheric and temperature conditions, to form the active brazing paste.

A special, unexpected advantage of the active brazing paste produced in accordance with the invention is that despite the use of a nondehydrogenated, i.e., hydrogenated, active brazing powder, brazing of the above-mentioned interface connections is readily possible.

One would expect that the adsorbed hydrogen, which splits off at the brazing temperature of approximately 1000° C. and penetrates into the joint space between insulating part and lead that is to be filled with brazing material by capillary action, would prevent the active brazing material from flowing into the joint space.

Another advantage of the invention is that because of the use of the hydrogenated active brazing powder, the production of the latter, the production of the active brazing paste, and the brazing operation can be far apart in time and need not be carried out in direct succession. Both the active brazing powder and the active brazing paste are at least sufficiently stable in storage.

After the grinding operation, the surface of the individual grains of the active brazing powder remains so completely saturated with hydrogen that subsequent aeration and storage under normal atmospheric and temperature conditions will not result in undesired oxidation, nitration, etc.

It should be emphasized that as the starting material for the hydrogenation and subsequent grinding, a previously prepared active brazing alloy has to be selected.

Especially suitable active brazing alloys for the active brazing paste according to the invention and for the brazing of the above-mentioned interface connections are the ternary ZrNiTi alloys described in EP-A-490 807 (=U.S. Ser. No. 07/791,092, Canadian Appln. No. 2,054,784).

It should be stressed that the term "hydrogenation" as used herein does not mean the formation of a hydrogen compound in the chemical sense but only refers to the adsorption of hydrogen at the surface of the grains of the active brazing powder.

We claim:

1. A method of producing an active brazing paste containing an active brazing powder and an organic material acting as a vehicle, said method comprising the steps of:
  prehydrogenating pieces of a selected active brazing alloy comprising polycrystalline pieces having grain boundaries by causing hydrogen to be adsorbed at the grain boundaries,
  grinding said prehydrogenated pieces in a mill with the addition of hydrogen to produce a hydrogenated active brazing powder, and
  forming the active brazing paste from the hydrogenated active brazing powder and said vehicle openly, under normal atmospheric and temperature conditions.

2. The method of claim 1, wherein the hydrogenated active brazing powder includes a plurality of individual grains which are saturated with hydrogen during the grinding step.

3. A method of producing an active brazing paste from a hydrogenated active brazing powder including a plurality of individual grains and an organic material acting as a vehicle, said method comprising the steps of:
  prehydrogenating pieces of a selected active brazing alloy having polycrystalline pieces with grain boundaries by causing hydrogen to be adsorbed at said grain boundaries;

grinding said prehydrogenated pieces in a mill with the addition of hydrogen to form the hydrogenated active brazing powder in which said individual grains of the active brazing powder are saturated with hydrogen; and forming the active brazing paste using the hydrogenated active brazing powder and said vehicle under normal atmospheric and temperature conditions.

* * * * *